Nov. 11, 1958     H. A. EDMONDSON     2,859,781
PROCESS FOR CUTTING WOOD
Filed Dec. 3, 1954                                   2 Sheets-Sheet 1
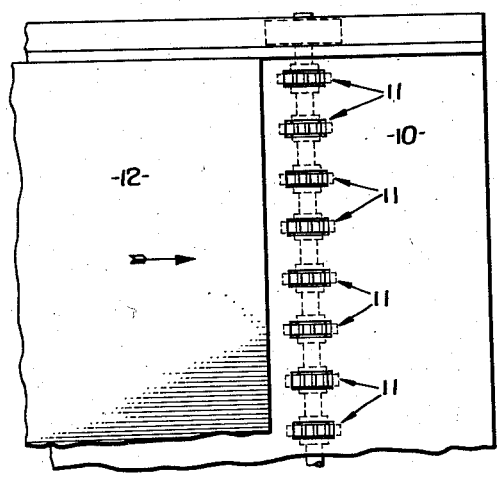
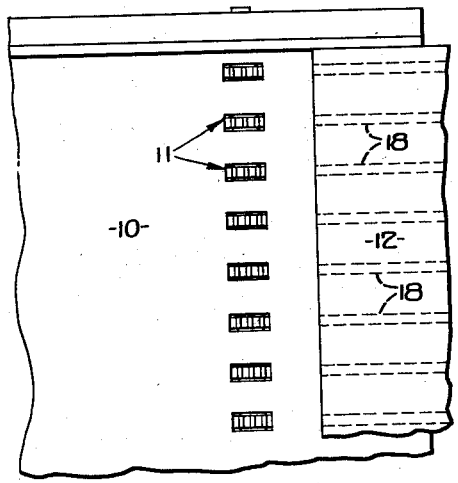
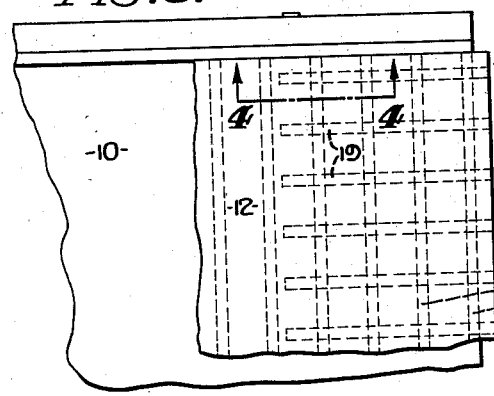
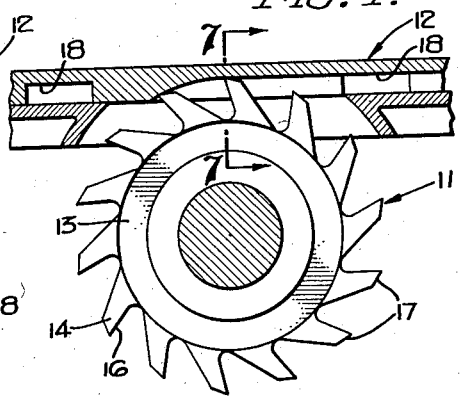
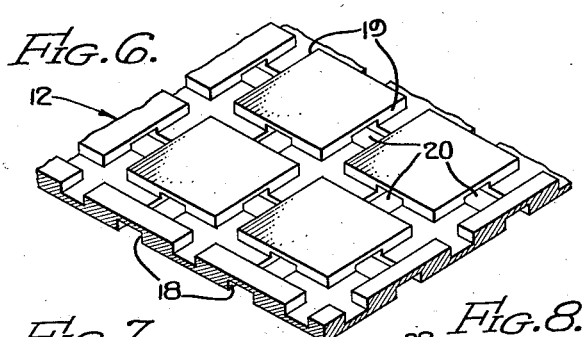
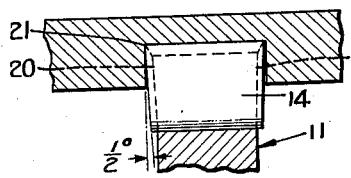
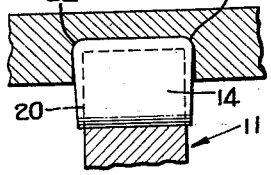
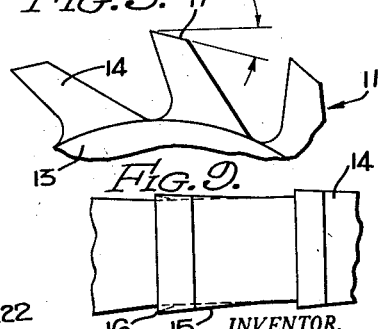
INVENTOR,
HAROLD A. EDMONDSON
BY
*Lyon & Lyon*
ATTORNEYS United States Patent Office 2,859,781
Patented Nov. 11, 1958

2,859,781
PROCESS FOR CUTTING WOOD
Harold A. Edmondson, Los Angeles, Calif.
Application December 3, 1954, Serial No. 472,940
6 Claims. (Cl. 144—309)

This invention relates to a process and apparatus for cutting wood and more particularly to a process and apparatus for fabricating panels from sheet plywood or the like, characterized by the fact that by a single operation a finished product is produced cutting either with or against the grain with no splitting, splintering, chewing, tearing or burning of the wood thus eliminating the necessity of a clean-up operation such as sanding or the like.

The invention is based upon the discovery that wood or similar material such as masonite, pressed wood and particularly plywood can be advantageously worked with a specially designed milling cutter rotating at high speeds to produce a finished cut.

It is accordingly one object of this invention to provide an improved method of cutting wood.

It is a further object of the invention to provide a method of manufacture of a light and sound wave absorbing panel from plywood or the like.

It is a further object of this invention to provide a method of cutting slots in wood leaving a smooth and polished surface.

It is a further object of this invention to provide a method of cutting the edges of wood and particularly plywood to leave a smooth and polished surface.

It is a further object of this invention to provide a method of cutting wood leaving clean and sharp edges to permit precision joining and fitting.

It is a further object of this invention to provide an improved milling cutter capable of use in the associated process.

These and other objects and advantages of the present invention will be apparent from the annexed specification in which:

Figure 1 is a fragmentary plan view of a milling table which may be used in carrying out the present invention, showing a sheet of wood about to be cut.

Figure 2 is a fragmentary plan view similar to Figure 1 showing a sheet of wood leaving the table after being cut.

Figure 3 is a plan view similar to Figures 1 and 2 showing a panel in the process of making the final cuts.

Figure 4 is an enlarged section taken along the line 4—4 of Figure 3.

Figure 5 is an enlarged fragmentary side view of a typical cutter.

Figure 6 is a perspective view of a typical panel formed in accordance with the present invention.

Figure 7 is a section taken along the line 7—7 of Figure 4.

Figure 8 is a similar section taken along the line 7—7 of Figure 4 with a different type of cutter.

Figure 9 is a plan view of the device shown in Figure 5.

Figure 10:
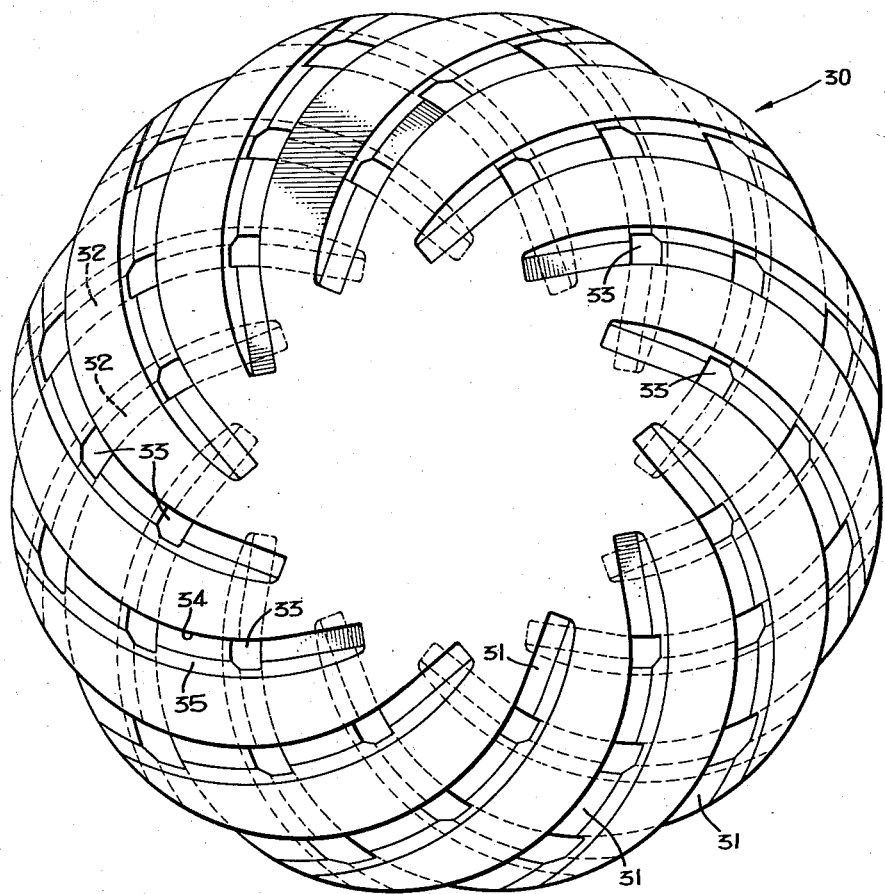
Figure 10 is a plan view of a modified form of panel.

Referring now more particularly to the drawings, there is shown a table 10 on which there is suitably mounted by any conventional means a plurality of cutters 11. It will be appreciated that the cutters 11 are driven by any suitable source of power and are mounted for adjustment in a vertical plane in the conventional manner. The table 10 supports a sheet 12 of material to be cut.

Referring more particularly to Figures 4, 5, 7, 8 and 9, the particular type cutter used in the process of this invention is shown. A cutter 13 which is generally in the shape of a standard milling cutter such as is used in the milling of metals is provided. The cutter presents teeth 14, the sides of which are bevelled as at 15 providing a side rake resulting in a razor-sharp cutting line 16 at the sides. The teeth are also sharpened with a top rake 17 of approximately 15° thus presenting a razor-sharp cutting edge which acts as a chisel which in the center of the cut shreds or chisels out small pieces of wood, which small pieces of wood are severed at the edges by the cutting line 16 resulting in a smooth mirror finish cut, both upon the sides and the bottom of the slot being cut. In order to prevent burning of the wood, the teeth 14 are also bevelled as at 20, preferably at a ½° angle so that no contact is made by the teeth with the walls of the slot excepting only at the tip 21 or rounded corner 22.

The cutter 13 is revolved at high speed, the speeds varying so as to give a linear speed to the teeth of from 5,000 to 15,000 feet per minute depending upon the nature of the wood being cut.

When using the process of this invention to manufacture a light and sound absorbing panel, such as is shown in Figure 6, a sheet of material 12 is laid upon the table 10 and passed over the bank of cutters 11 resulting in the cutting of a plurality of spaced grooves or slots 18 in the bottom of the panel. The sheet 12 may then be turned over and rotated 90° and passed backward over the cutters 11, as shown in Figure 3, to cut a series of parallel slots 19 on the other face thereof. The depth of cut is regulated so as to produce slots 18 and 19 having a combined depth greater than the thickness of the sheet 12 so that at the intersections thereof, openings 20 are formed completely through the panel. As shown in Figures 7 and 8 the teeth may be chosen with square ends as shown in Figure 7 or rounded ends as shown in Figure 8, to produce sharp right angular cuts as shown in Figure 6 or rounded corner cuts as shown in Figure 8. With the cutter having teeth shown with a square end such as shown in Figure 7, the process may be used to cut the edges of wood to provide a straight finished edge precision sharp to permit joining and fitting without hollows or humps.

If desired, the cutters 11 may be mounted as in a table saw for angular disposition with respect to the table to permit the cutting of precision miters.

Referring now more particularly to Figure 10, there is shown a panel which illustrates the versatility of this invention in cutting free forms, circles, arcs and the like. This panel 30 is preferably of plywood and has cut therein along an arc a plurality of curved slots 31 on the top face intersecting a plurality of curved slots 32 cut on the bottom face to leave apertures 33 all the way through the panel as indicated. The slots in each case will have one straight wall 34 and one bevelled wall 35 due to the action of the side of the cutter as the panel 30 is turned about the centers upon which the arcs of the slots are cut.

While there has been described what is at present considered a preferred embodiment of the present invention, it will be appreciated by those skilled in the art that various changes and modifications can be made therein without departing from the essence of the invention and it is intended to cover herein all such changes and modifications as come within the true spirit and scope of the appended claims.

I claim:
1. The process of fabricating a panel from plywood having light and sound wave absorption characteristics consisting of the steps of cutting the plywood panel on its face in parallel channels with a rotary cutter operated at a peripheral cutting speed of between 5,000 and 15,000 feet per minute and where the cutter teeth are formed to chisel the channel from the plies of said panel at an angle of attack of approximately 15° and where the cuttings are severed from the edges of the channel by the sharpened edges of the cutter resulting from an applied positive side rake on said cutter.

2. The process of making apertured plywood panels consisting of: cutting a series of parallel slots on one face of a plywood sheet by means of a rotating milling cutter with the sides thereof sharpened and relieved inwardly to present a sharp line contact only at the edges of said slots rotating at a linear speed of 5,000 to 15,000 feet per minute; similarly cutting a second series of slots intersecting the slots on the other side of said sheet; said slots being cut to a combined depth exceeding the thickness of said sheet to produce a series of spaced apertures at the intersection of said slots.

3. The process of cutting wood consisting of: passing a panel of said wood to a rotary milling cutter rotating at a peripheral linear speed of from 5,000 to 15,000 feet per minute; said milling cutter having teeth, the sides of which are sharpened and relieved inwardly to present a sharp line contact only at the edges of the cut whereby said cut is cut to a smooth and uniform surface.

4. The process of cutting wood consisting of: passing a panel of said wood to a rotary milling cutter rotating at a peripheral linear speed of from 5,000 to 15,000 feet per minute; said milling cutter having teeth, the sides of which are sharpened and relieved inwardly to present a sharp line contact only at the edges of the cut whereby said cut is cut to a smooth and uniform surface; said teeth being wider at the top than at the bottom to prevent burning of the walls of said cuts.

5. The process of cutting wood consisting of: passing a sheet of said wood to a rotary milling cutter having a plurality of parallel rotary blades having teeth rotating at a peripheral linear speed of from 5,000 to 15,000 feet per minute; said milling cutter having teeth, the sides of which are sharpened and relieved inwardly to present a sharp line contact only at the edges of the cut whereby said cut is cut to a smooth and uniform surface.

6. The process of cutting wood consisting of: passing a sheet of said wood to a rotary milling cutter having a plurality of parallel rotary blades having teeth rotating at a peripheral linear speed of from 5,000 to 15,000 feet per minute; said milling cutter having teeth, the sides of which are sharpened and relieved inwardly to present a sharp line contact only at the edges of the cut whereby said cut is cut to a smooth and uniform surface; said teeth being wider at the top than at the bottom to prevent burning of the walls of said cuts.

References Cited in the file of this patent

UNITED STATES PATENTS

| | | |
|---|---|---|
| 549,318 | Johnson | Nov. 5, 1895 |
| 1,708,442 | Eckersley | Apr. 9, 1929 |
| 1,831,303 | Hall | Nov. 10, 1931 |
| 2,520,116 | Christenson | Aug. 29, 1950 |

FOREIGN PATENTS

| | | |
|---|---|---|
| 403,249 | Great Britain | Dec. 21, 1933 |
| 710,286 | France | June 1, 1931 |